July 28, 1970    E. H. WRENCH    3,521,946
OPTICAL PANEL

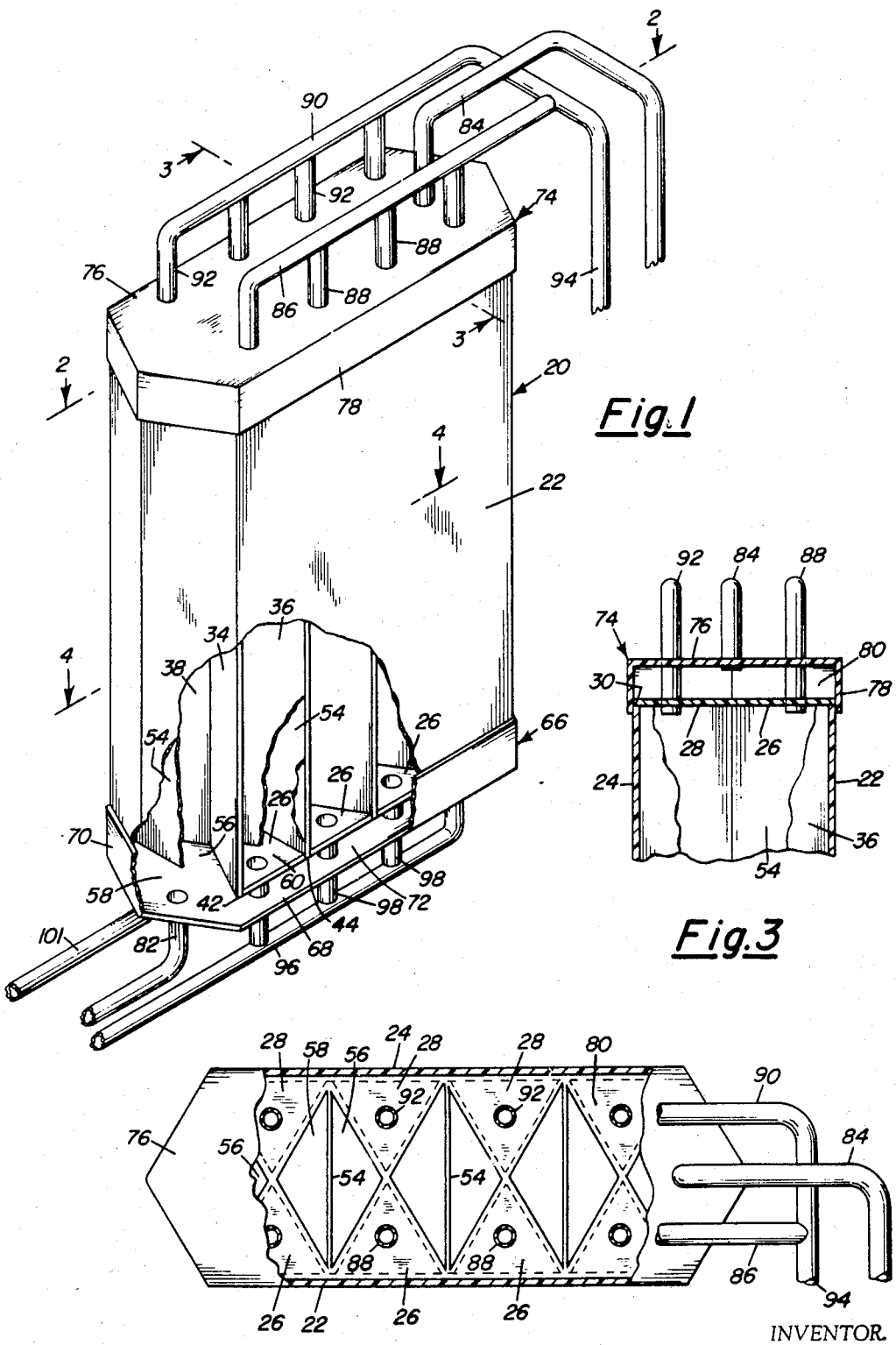

Filed Nov. 10, 1966    3 Sheets-Sheet 2

INVENTOR.
EDWIN H. WRENCH

BY

ATTORNEYS

July 28, 1970   E. H. WRENCH   3,521,946
OPTICAL PANEL

Filed Nov. 10, 1966   3 Sheets-Sheet 3

INVENTOR.
EDWIN H. WRENCH

BY

ATTORNEYS

United States Patent Office 3,521,946
Patented July 28, 1970

3,521,946
OPTICAL PANEL
Edwin H. Wrench, 411 Archer St.,
La Jolla, Calif. 92037
Filed Nov. 10, 1966, Ser. No. 593,523
Int. Cl. G02f 1/30
U.S. Cl. 350—267   8 Claims

ABSTRACT OF THE DISCLOSURE

The present invention relates to optical panels, and more particularly to optical panels having chambers which, when filled with a light refractive liquid, operates to impede or prevent the passages of light rays therethrough, but which is transparent to light rays when the liquid is removed.

---

The present invention is suitable as a structural part of a roof or wall for a building wherein it is at times desirable to reduce the intensities of light rays or glare, or prevent the introduction of light rays, or transmit only light rays of desirable color.

In carrying out the present invention, the optical panel includes a plurality of oblong-shaped chambers which are adapted to contain a refraction liquid, such as water or anti-freeze liquid. Preferably, the elongated chambers are arranged in pairs and each pair is in the form of a diamond or rhomboidal in transverse cross section. Each of these chambers includes an elongated wall, preferably having two portions disposed at an obtuse angle with respect to one another and an elongated wall having a surface which confronts the sections, the surface having the characteristic of impeding or preventing light reflections.

The second mentioned wall may be opaque or translucent and can be of any desirable color or black.

Being oblong, all light rays entering the chambers are deflected to the wall having the surface which impairs reflections when the chambers are filled with refractive liquid; and all light rays entering the chambers, except those which are deflected due to the inherent deflective characteristic of the transparent chambers, pass through the chambers when no refractive liquid is present therein.

The space between the oblong-shaped chambers can be encased to form chambers for holding liquid whereby, when it is desirable to remove the refractive liquid from the oblong-shaped chambers, it can be stored in the second mentioned chambers in which locations the light rays are not deflected thereby toward the light impeding surfaces.

Other features and advantages of the present invention will be apparent from the following description, reference being had to the accompanying drawings wherein preferred embodiments of the invention are illustrated.

In the drawings:

FIG. 1 is a perspective view of a panel showing one form of the invention, parts thereof being broken away to more clearly illustrate the construction;

FIG. 2 is a view partly in section, the section being taken along line 2—2 of FIG. 1;

FIG. 3 is a fragmentary sectional view taken along line 3—3 of FIG. 1;

Figure 7:
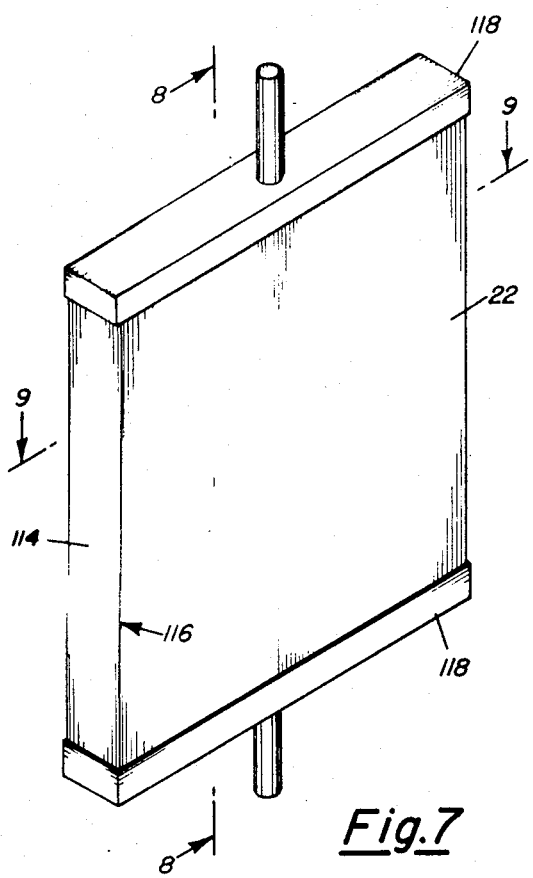
FIG. 7 is a fragmentary perspective view of another form of the invention.
Figure 8:
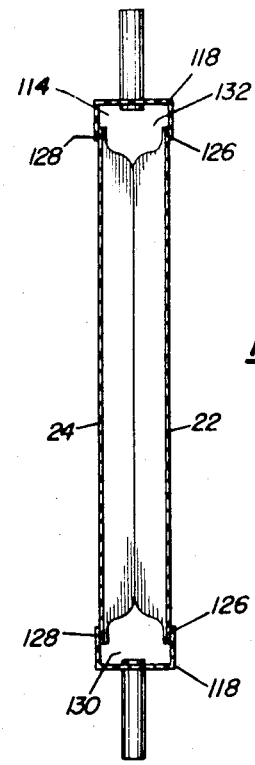
Figure 9:
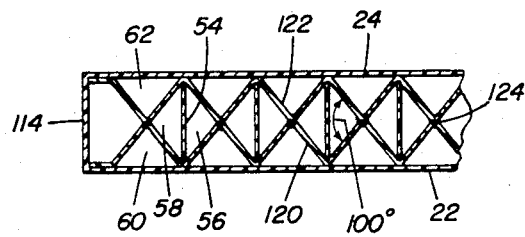

FIGS. 8 and 9 are fragmentary views taken along line 8—8 and 9—9, respectively, of FIG. 7.

Referring more in detail to the drawings, and more particularly to FIGS. 1 to 4, the panel 20 includes a pane 22, which confronts and receives light rays, a parallelly disposed and spaced pane 24, which confronts the area to be protected by a panel. The panel also includes a plurality of triangularly shaped end walls 26 and opposite like shaped end walls 28.

The panel also includes a plurality of transparent walls 34, 36, 38 and 40.

The outer ends 42 and 44 of walls 34 and 36 are hermetically sealed with pane 22, and the outer ends 46 and 48 of walls 38 and 40 are hermetically sealed with the pane 24. The inner ends of walls 34 and 38 are hermetically and sealingly joined with one another, as at 50, and the inner ends of the walls 36 and 40 are hermetically and sealingly joined with one another, as at 52.

The walls 34 and 38 are disposed at an obtuse angle with respect to one another. Likewise walls 36 and 40 are so disposed. This obtuse angle may be one hundred and ten degrees, however I prefer an angle of approximately one hundred degrees. A wall 54 is interposed between the ends 42 and 46 of walls 34 and 36, and a like wall is interposed between the ends of walls 36 and 40. Each set of walls 34, 38 and 54 form the side walls of a chamber 56, and each set of walls 36, 40 and 54 form the side walls of a chamber 58. Each set of walls 34, 36, pane 22, an upper end wall 26 and a lower end wall 28 forms a closed chamber 60. And each set of walls 38, 40, pane 24, an upper end wall 26 an a lower end wall 28 provides a closed chamber 62.

The opposite faces of each of the walls 54 have the characteristics of impeding or preventing reflection of light rays.

If only a partial control of light ray transmission is desirable, the relative lengths of the walls 54 are computed with respect to the lengths of the chambers 56 and 58. Usually, the lengths of the walls 54 coincide with the lengths of the chambers 56 and 58.

The walls 54 may be opaque or translucent, and are preferably impervious. When no refractive material is contained in the chambers 56 and 58, all light rays, except those which are deflected due to the inherent light deflective characteristics of the transparent material entering, for example, the pane 22, will pass through the panel. If however, the walls are black and the chambers 56 and 58 contains desired refractive liquid, all light rays entering those chambers and aligned with the liquid will be refracted to the surface of the wall 36, since the angle of incident caused by the refractive characteristics of the liquid, such as water, so directs the rays, with the result that the rays are not reflected from the element. Consequently, if the chambers 56 and 58 are filled with the desired refractive liquid, no light rays will pass through those chambers, or if the upper part of those chambers contains no refractive liquid, only thtat part of the chambers containing such liquid will be effective for preventing reflection of the light rays. Therefore, by controlling the height of liquid in the chambers 56 and 58, the degree of light ray transmission can be controlled.

The degree of light ray transmission can also be controlled by vertical or horizontal stratification of the reflective characteristic of the walls 54. For example, part or parts of the walls 54 can be blackened and part or parts thereof can have reflective characteristic. The degree of light ray transmission can be controlled also by controlling the translucency of the wall 54. Too, the color of the light rays emanating from the panel can be controlled by selecting desirable color surfaces on the wall 36. Intensity can be controlled also by selective filling only some of the chambers.

The panes 22 and 24 and walls 26 and 28 form pairs of liquid chambers 60 and 62 between adjacent chambers 56 and 58. The sets of chambers 60 and 62 are interconnected with sets of chambers 56 and 58 whereby when it is desirable to render the refractive liquid ineffective, the liquid is moved from the chambers 56 and 58 to the chambers 60 and 62. Too, if it is desirable to partially render the refractive liquid ineffective, the requisite amount of liquid is moved from all or some of the chambers 56 and 58 to chambers 60 and 62. Since the chambers 56 and 58 are adjacent chambers 60 and 62, the cost of moving the refractive liquid from one set of chambers to the other set is reduced to a minimum. Any suitable mechanism can be employed for transferring the liquid.

Figure 4:
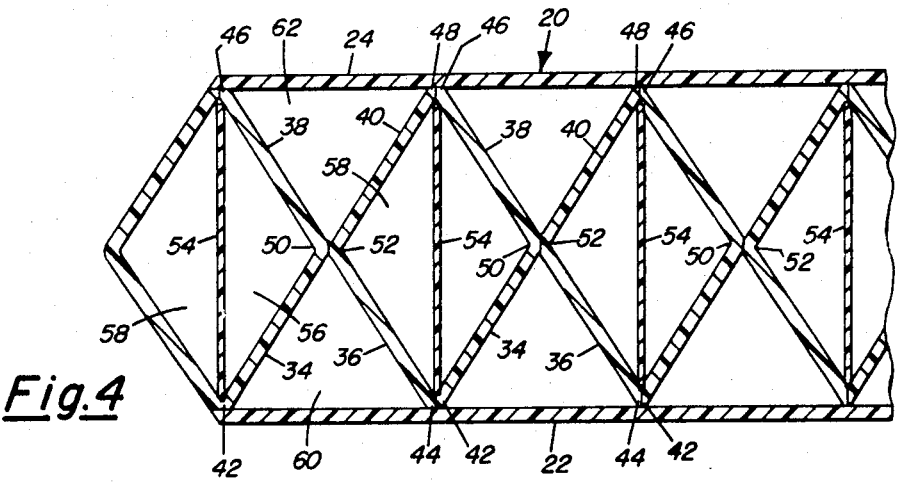
FIG. 4 is a fragmentary sectional view taken along line 4—4 of FIG. 1.
Figure 5:
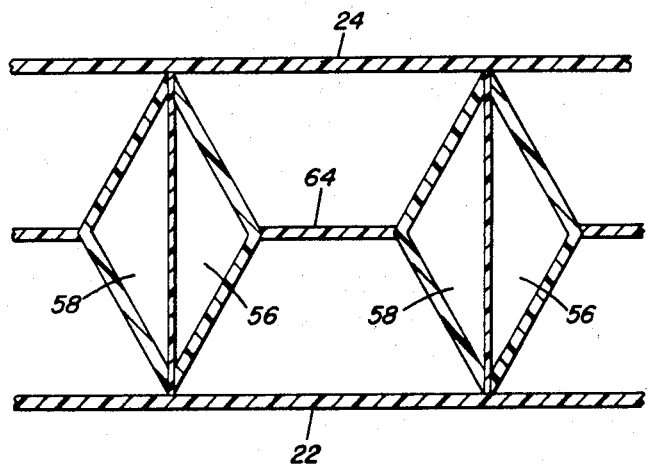
FIG. 5 is a fragmentary sectional view of another form of the invention.

In the embodiments shown in FIG. 5, the intensity of transmission of light rays can be controlled by spacing pairs of chambers 56 and 58 from one another by sections 64. The degree of intensity of light ray transmission can be controlled by controlling the areas of sections 64 or by selecting desirable colors or blackening all or part of the same.

It will be observed that the combined capacity of chambers 56, 58 equals or substantially equals the combined capacity of chambers 60 and 62. Therefore, when it is desirable to not impede or it is desirable to only partially impede the transmission of light through the panel, all or the desired part of the refractive liquid can be transferred from chambers 56 and 58 to chambers 60 and 62. At that time the area in chambers 56 and 58 which is void of refractive liquid will not reflect light rays except those reflected while passing through the transparent material.

Many desirable arrangements can be perfected for transferring refractive liquid from chambers 56 and 58 to chambers 60 and 62, and vice versa. One form is illustrated in FIGS. 1 to 4 and 6. In that embodiment the lower end of the panel 20 includes a cap 66 having a bottom wall 68, which is suitably spaced from the underside of end walls 28; the cap also includes a peripheral upright section 70 which is hermetically sealed with the panes 22 and 24 and the extreme ends of aforementioned chambers. Thus, the bottom wall 68, end walls 28 and section 70 form a chamber or manifold 72 below all of the chambers. A similar cap 74 is provided for the upper end of the panel 20; it includes a top wall 76, which is spaced from the end walls 26 and a peripheral section 78, which is hermetically sealed to the panel to form an upper chamber or manifold 80 above all the aforesaid chambers.

The lower ends and the upper ends of the walls 54 or parts of each are spaced from the bottom wall 68 of cap 66 and from the top wall 76 of cap 74, whereby the chambers 68 and 80 form lower and upper manifolds, respectively, for the chambers 56 and 58. Refractive liquid is delivered to and from the manifold 68 by a pipe 82, and the liquid is delivered to or from the manifold 80 by a pipe 84.

The chambers 60 are connected at the upper ends thereof to a manifold 86 by pipes 88, which extend through end walls 26 and the upper ends of chamber 62 are connected to a manifold 90 by pipes 92, which extend through the end walls 26. The manifolds 86 and 90 are connected with a pipe 94. The lower ends of chamber 60 are connected to a manifold 96 by pipes 98, which extend through end walls 28 and the lower ends of the chambers 62 are connected to a manifold 100 by pipes like 98, which extend through end walls 28.

Figure 6:
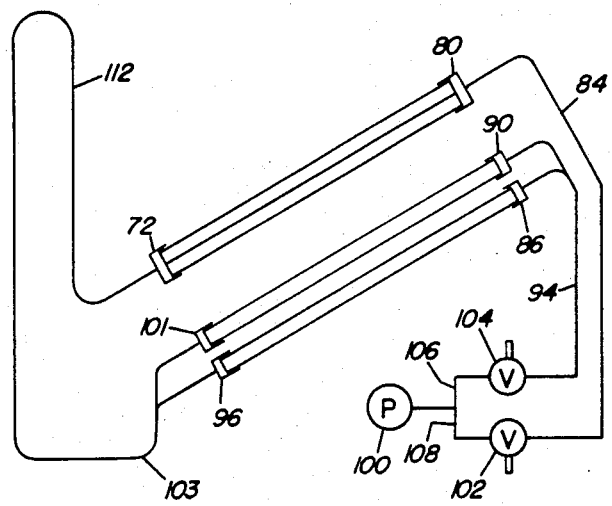
FIG. 6 is a schematic view of a system for moving the refractive liquid from one set of chambers to another set.

Referring now to FIG. 6, an air pump 100 is used for moving the refracting liquid from chambers 56 and 58 to chambers 60 and 62 and vice versa. Two air valves 102 and 104 are employed. If for example, it is desirable to move refracting liquid from chambers 60 and 62 to chambers 56 and 58, valve 104 will be moved from a position of air exhaustion to a position in which it is connected to the pump by pipes 106 and 108, and valve 102 will be moved from a position of connection with the pump to a position in which it exhausts air. Then upon actuation of the pump air under pressure will flow from the pump through pipe 108 and 106, valve 104, pipe 94, manifolds 86 and 90, in parallel, pipes 88 and 92, chambers 60 and 62, to force the liquid from said chambers through pipes 98 to manifolds 96 and 101, pipe 103, siphoning prevention tube 112, into manifold 72 in the bottom of the panel 22 and into the chambers 56 and 58. The air will be exhausted from these latter mentioned chambers through the upper manifold 80 and through pipe 84 and valve 102. After the desired amount of liquid is moved, the pump will be rendered inoperative.

To empty or partially empty chambers 56 and 58, valve 104 will be moved from the last mentioned positions to one in which it is disconnected from the pump and connected with an air exhaust port; valve 102 will be disconnected from its air exhaust port to a position in which it receives air from the pump; and then the pump 100 is rendered effective. The air will force the liquid out of chambers 56 and 58 and the liquid will force the air out of chambers 60 and 62.

Referring now to the embodiment shown in FIGS. 7, 8 and 9, it will be seen that the chambers 56, 58, 60 and 62 are formed partly by panes 22 and 24, which are formed integrally with sides 114 to form a rectangularly shaped sleeve 116; end covers 118 close the opposite ends of the sleeve; two zig-zag shaped sections 120 and 122 are disposed within the sleeve having their apices welded to one another, the welds being shown at 124. The wall 54 is the same as described with respect to the other embodiment. All of these elements may be formed of suitable plastic, elements 22, 24, 120 and 122 being transparent.

The upper and lower ends of the sections 120 and 122 are crushed against and welded to the panes 22 and 24, respectively, as at 126 and 128, to provide lower and upper manifolds 130 and 132 which are connected with the lower and upper portions of chambers 56 and 58. Refractive liquid is delivered to and from the chambers through pipes 126 and 128.

The present invention is useful in many ways, particularly where it is desirable to impede or completely obstruct the passage of light rays. One such use is where skylights are employed in, for example, a closed stadium, and where it is desirable to prevent light reflecting from the skylights.

The sun rays may also be utilized for heating the liquid in the chambers and this heated liquid can be used for many purposes, as for example, for heating the refrigerant of an absorption type refrigerating system.

While the forms of embodiment herein shown and described, constitute preferred forms, it is to be understood that other forms may be adopted.

I claim:
1. An optical panel comprising:
  (A) means forming a chamber for liquid, including:
    (1) a vertically extending, transparent wall,
    (2) a second vertically extending transparent wall, said walls being disposed at an obtuse angle with respect to one another, a vertically extending edge of each being joined,
    (3) a vertically extending wall bridging and connected with the opposite edges of the first and second mentioned walls, the surface of the bridging wall that confronts the first and second mentioned walls having the characteristic of impeding light transmission and light reflection,
    (4) a bottom wall bridging the aforesaid walls;
  (B) means forming a second chamber for liquid including:

(1) the first mentioned wall (A)(1) of the first mentioned chamber,
(2) a vertically extending, transparent wall having a vertically extending edge joined with said opposite edge of the first mentioned wall, said wall (B)(2) being disposed substantially at right angles with respect to the wall (A)(3) having said impeding surface,
(2) vertically extending wall means having a vertically extending edge joined with the opposite edge of the wall (B)(2) and joined with the first mentioned edge of the first mentioned wall of the first mentioned chamber,
(4) a bottom wall bridging the first mentioned wall (A)(1), the wall (B)(2) and the wall means (B)(3).

2. An optical panel as defined in claim 1, characterized in that the third mentioned wall (A)(3) is opaque.

3. An optical panel as defined in claim 1, characterized in that the third mentioned wall (A)(3) is translucent.

4. An optical panel as defined in claim 1, characterized to include:
(C) conduit means interconnecting the chambers;
(D) means for moving liquid through the conduit means.

5. An optical panel as defined in claim 1, characterized to include:
(C) means forming a third chamber for liquid, including:
(1) the second mentioned wall (A)(2) of the first mentioned chamber,
(2) a vertically extending, transparent wall having a vertically extending edge joined with said opposite edge of the second mentioned wall (A)(2), said wall (C)(2) being disposed substantially at right angles with respect to the wall (A)(3) of the first mentioned chamber having the impeding surface,
(3) vertically extending wall means having a vertically extending edge joined with the opposite edge of the wall (C)(2) and joined with the first mentioned edge of the second mentioned wall of the first mentioned chamber,
(4) a bottom wall bridging the second mentioned wall (A)(1), the wall (C)(2) and the wall means (C)(3).

6. An optical panel as defined in claim 5, characterized to include:
(D) means forming a fourth chamber for liquid, including:
(1) said walls (B)(3) and (C)(3),
(2) a vertically extending wall bridging and connected with the opposite edges of the wall (B)(3) and the wall (C)(3), the surface of the bridging wall (D)(2) that confronts the walls (B)(3) and (C)(3) having the characteristic of impeding light transmission and light reflection,
(3) a bottom wall bridging said walls (B)(3), (C)(3) and (D)(2).

7. An optical panel as defined in claim 6, characterized to include:
(E) conduit means connecting the first and fourth mentioned chambers in parallel;
(F) conduit means connecting the second and third mentioned chambers in parallel;
(G) means for moving liquid from the first and fourth mentioned chambers into the second and third mentioned chambers, and vice versa.

8. An optical panel as defined in claim 1, characterized in that the capacity of the first and second mentioned chambers are substantially equal.

References Cited

UNITED STATES PATENTS

| | | | |
|---|---|---|---|
| 2,481,660 | 9/1949 | Harrison | 350—267 X |
| 2,350,712 | 6/1944 | Barsties. | |
| 3,001,300 | 9/1961 | Green. | |

RONALD L. WIBERT, Primary Examiner

P. K. GODWIN, Jr., Assistant Examiner

U.S. Cl. X.R.
350—286